(12) United States Patent
Carpman et al.

(10) Patent No.: US 8,994,554 B2
(45) Date of Patent: Mar. 31, 2015

(54) METHOD TO EXTRACT BILLING TYPE PEAK DATA FROM AN EXISTING ELECTRIC METER INSTALLATION

(75) Inventors: Joshua Carpman, Houston, TX (US); Charles N. Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 630 days.

(21) Appl. No.: 13/333,141

(22) Filed: Dec. 21, 2011

(65) Prior Publication Data
US 2012/0169512 A1 Jul. 5, 2012

Related U.S. Application Data (60) Provisional application No. 61/425,342, filed on Dec. 21, 2010.

(51) Int. Cl.
*G08B 21/00* (2006.01)
*G01F 1/60* (2006.01)
*G06Q 50/06* (2012.01)
*G06Q 30/04* (2012.01)

(52) U.S. Cl.
CPC *G01F 1/60* (2013.01); *G06Q 50/06* (2013.01); *G06Q 30/04* (2013.01)
USPC .................. 340/870.16; 340/540; 340/870.11

(58) Field of Classification Search
USPC .................. 340/870.16, 870.09, 870.02, 540, 340/870.11, 825.06–825.09
See application file for complete search history.

(56) References Cited

U.S. PATENT DOCUMENTS

| | | | |
|---|---|---|---|
| 4,697,182 A * | 9/1987 | Swanson .................. 340/870.02 |
| 5,502,339 A * | 3/1996 | Hartig ............................. 307/31 |
| 2002/0039069 A1* | 4/2002 | Chance et al. ........... 340/870.09 |
| 2006/0032317 A1* | 2/2006 | Furmidge et al. ........... 73/861.19 |
| 2010/0283606 A1* | 11/2010 | Tsypin et al. .................. 340/540 |

* cited by examiner

*Primary Examiner* — Daniel Previl
(74) *Attorney, Agent, or Firm* — Elwood L. Haynes (57) ABSTRACT

Techniques are disclosed for monitoring the consumption of a plurality of metered resources. The techniques involve receiving a KYZ pulse from a first utility meter, where the first utility meter is coupled to a source of one of the metered resources, and where the first utility meter outputs the KYZ pulse based on a predefined amount of metered resource being passed through the utility meter. A first counter is incremented, where the first counter is associated with the utility meter and stored in a memory.

15 Claims, 6 Drawing Sheets

Monitor Settings

General Settings

Demand Interval: 15.0

Month Start Day: 1

Hour Start Day: 00:00

Meter 1 Settings

Form Factor: A

KW/Pulse: 10.0

KVAR/Pulse: 5.0

Premium 1: 1000.0

Premium 2: 2000.0

Premium 3: 3000.0

Meter 2 Settings

Form Factor: A

Gallons/Pulse: 0.5

Liters/Pulse: 1.89

Premium 1: 1000.0

Premium 2: 2000.0

Premium 3: 3000.0

Meter 3 Settings

Form Factor: C

Therms/Pulse: 0.08

BTU/Pulse: 8,000.0

Premium 1: 1000.0

Premium 2: 2000.0

Premium 3: 3000.0

(Update)

METHOD TO EXTRACT BILLING TYPE PEAK DATA FROM AN EXISTING ELECTRIC METER INSTALLATION

CROSS-REFERENCE TO RELATED APPLICATIONS

This application claims the benefit under 35 U.S.C. §119(e) to provisional application No. 61/425,342, filed Dec. 21, 2010, the entire contents of which are incorporated herein by reference.

BACKGROUND

Utility meters are generally used by utility providers, e.g. water, gas, and electric companies, to accurately bill consuming entities, i.e., a home or an office building based on their rate of consumption. Such meters are typically disposed between a consuming entity (hereinafter "customer") and a source of a metered resource (also referred to herein as "utility")—such as a home and an overhead power line. When a utility is consumed, the meter samples a rate at which the utility flows and formats this rate into a billable unit of measurement. For example, electricity consumption is typically measured in kilowatt hours (1000 watt hours), gas consumption is typically measured in therms (energy equivalent of burning 100 ft$^3$ of gas), and water consumption is typically measured in gallons or liters, where each is billed to the customer at a particular rate. Utility providers retrieve these measurements through employees that physically visit and read the meter or, more recently, by electronically receiving such information from the meter over telephone/internet communication lines.

As new technologies emerge, the provision of utilities and the consumption thereof is becoming increasingly complex. For example, with respect to energy utility, solar panels, upon nightfall, decrease their energy output, thereby decreasing a total amount of energy that is available in an energy grid to which they are attached. In another example, energy output of wind turbines is highly volatile due to the number of factors that influence wind direction and strength, which further contributes to fluctuations in the power grid. These inconsistencies, when combined with average increases in population and usage of electrical devices, results in a highly complex energy system.

As a result, a highly complex pricing model has emerged for individual and business customers. For example, prices of utilities are known to be updated in as little as fifteen minute intervals based on a plurality of parameters including, for example, local/total availability, local/total demand, time of day, day of week, and/or month of year. Consequently, it has become difficult for customers to track their usage and/or anticipate their utility bills. Moreover, meters are often located in areas that are inconvenient or dangerous for customers to access. Furthermore, usage statistics are often indicated in an unintuitive manner on the meter (i.e., using multiple physical dials), making it difficult for the customer to determine their overall usage.

SUMMARY

One embodiment of the invention provides a method for monitoring the consumption of one or more metered resources. The method may generally include first receiving a KYZ pulse from a first utility meter. The first utility meter is coupled to a source of one of the metered resources and, further, the first utility meter outputs the KYZ pulse based on a predefined amount of metered resource being passed through the utility meter. In response, a first counter is incremented, where the first counter is associated with the utility meter and stored in a memory.

Still another embodiment of the invention includes a system comprising both a processor and a memory. The memory stores an application which, when executed on the processor, performs an operation for monitoring and storing data associated with the consumption of a plurality of metered resources. This operation comprises first receiving a KYZ pulse from a first utility meter, where the first utility meter is coupled to a source of one of the metered resources, and where the first utility meter outputs the KYZ pulse based on a predefined amount of metered resource being passed through the utility meter. A first counter is incremented, where the first counter is associated with the utility meter and stored in a memory.

Yet another embodiment of the invention includes a computer-readable storage medium containing an application which, when executed on a processor, performs an operation for monitoring and storing data associated with the consumption of a plurality of metered resources. This operation involves receiving a KYZ pulse from a first utility meter. The first utility meter is coupled to a source of one of the metered resources and, further, the first utility meter outputs the KYZ pulse based on a predefined amount of metered resource being passed through the utility meter. In response, a first counter is incremented, where the first counter is associated with the utility meter and stored in a memory.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers.

DESCRIPTION OF PREFERRED EMBODIMENTS

As described in greater detail below, embodiments of the invention provide a computer-implemented method for monitoring the consumption of a plurality of metered resources. The method involves receiving a KYZ pulse from a utility meter—where the utility meter is coupled to a source of one of the metered resources, and where the utility meter outputs the KYZ pulse based on a predefined amount of metered resource being passed through the utility meter. A counter associated with the utility meter is incremented when the KYZ pulse is received, where the counter is associated with the utility meter and stored in a memory. Subsequently, a user may interact with active and historical consumption data established based on the counter stored in the memory.

Thus, embodiments of the invention provide information not made readily available by typical utility meters used by utility companies. Such information includes, for example, active consumption rates, receiving alerts when consumption thresholds are surpassed, and detailed billing data. Further, such information is accessible remotely, thereby enabling a user to actively view consumption of the metered resource and billing data associated therewith.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified herein.

Figure 1:
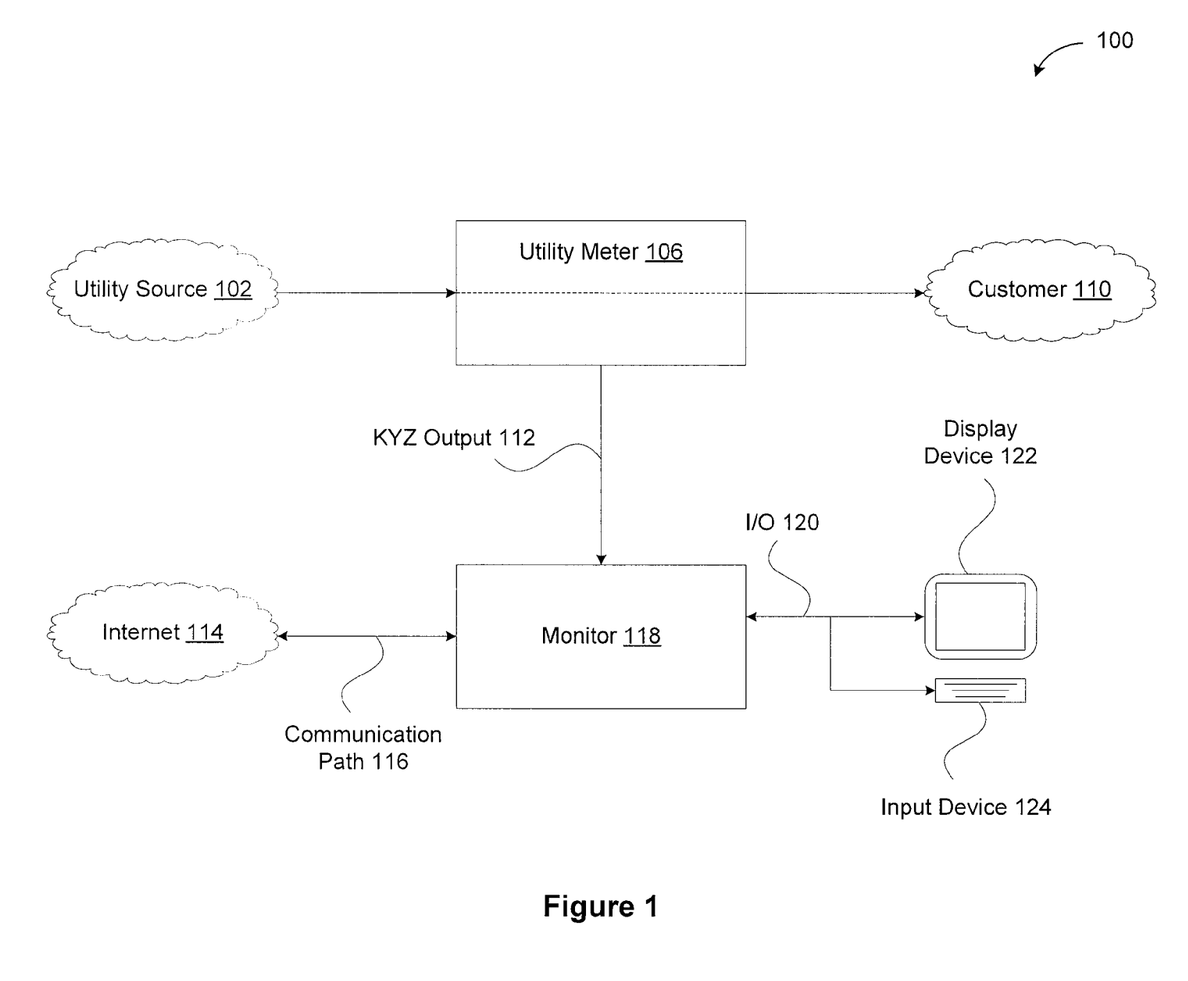
FIG. 1 illustrates a system configuration in which one or more embodiments of the present invention may be implemented.

FIG. 1 illustrates a system configuration 100, in which one or more embodiments of the present invention may be implemented. As shown, the system 100 includes a utility source 102, a utility meter 106, and a customer 110. The utility source 102 represents, for example, an energy grid that is fed by multiple energy providers. The energy grid generally delivers the energy to customers i.e., businesses and homes. In order to properly bill utility usage to customers, the utility meter 106 is configured to measure the metered resource being passed between the utility source 102 and the customer 110 and to record a cumulative total usage.

Most, if not all, standard utility meters produce a "KYZ pulse" output via KYZ output 112 each time a threshold amount of electrical energy is consumed by the customer 110. Such thresholds are dependent on a number of factors, including a model type of the utility meter 106, an average amount of utility that the utility meter 106 expects to measure, e.g., high-voltage connections for large businesses vs. low-voltage connections for small businesses, etc. For example, if the utility meter 106 serves as an electricity meter for a small home, then the utility meter 106 may be configured to output a KYZ pulse each time a particular unit of energy is consumed, e.g. ten watts (0.01 kilowatt hours) or kilovolt amperes (KVAs). In contrast, if the utility meter 106 is an electricity meter for a large manufacturing facility, then the utility meter 106 may be configured to output a KYZ output 112 each time 100 watts (0.1 kilowatt hours) is consumed. Thus, the KYZ output settings of utility meter 106 must first be associated with a monitor 118, as discussed in further detail below.

To make use of the KYZ pulses, the system configuration 100 includes a monitor 118 that receives the KYZ pulses as input. In one embodiment, the monitor 118 provides a combination of hardware and firmware configured to receive and perform useful measurements on KYZ pulses from the utility meter 106. For the monitor to properly interpret the KYZ output 112, the monitor 118 may be configured with parameters corresponding to the configuration of the utility meter 106, discussed in further detail below in conjunction with FIG. 4. As shown, the monitor 118 is connected to internet 114 via communication path 116, enabling a user to remotely interact with the monitor 118. The monitor 118 also outputs measurement information to display device 122 (i.e., a liquid crystal display (LCD)) via input/output (I/O) 120 so that a user may observe utility usage statistics generated by the monitor 118 on-site. Furthermore, the monitor 118 may optionally receive configuration input, via input device 124, from the user—described in further detail below in conjunction with FIG. 2.

Figure 2:
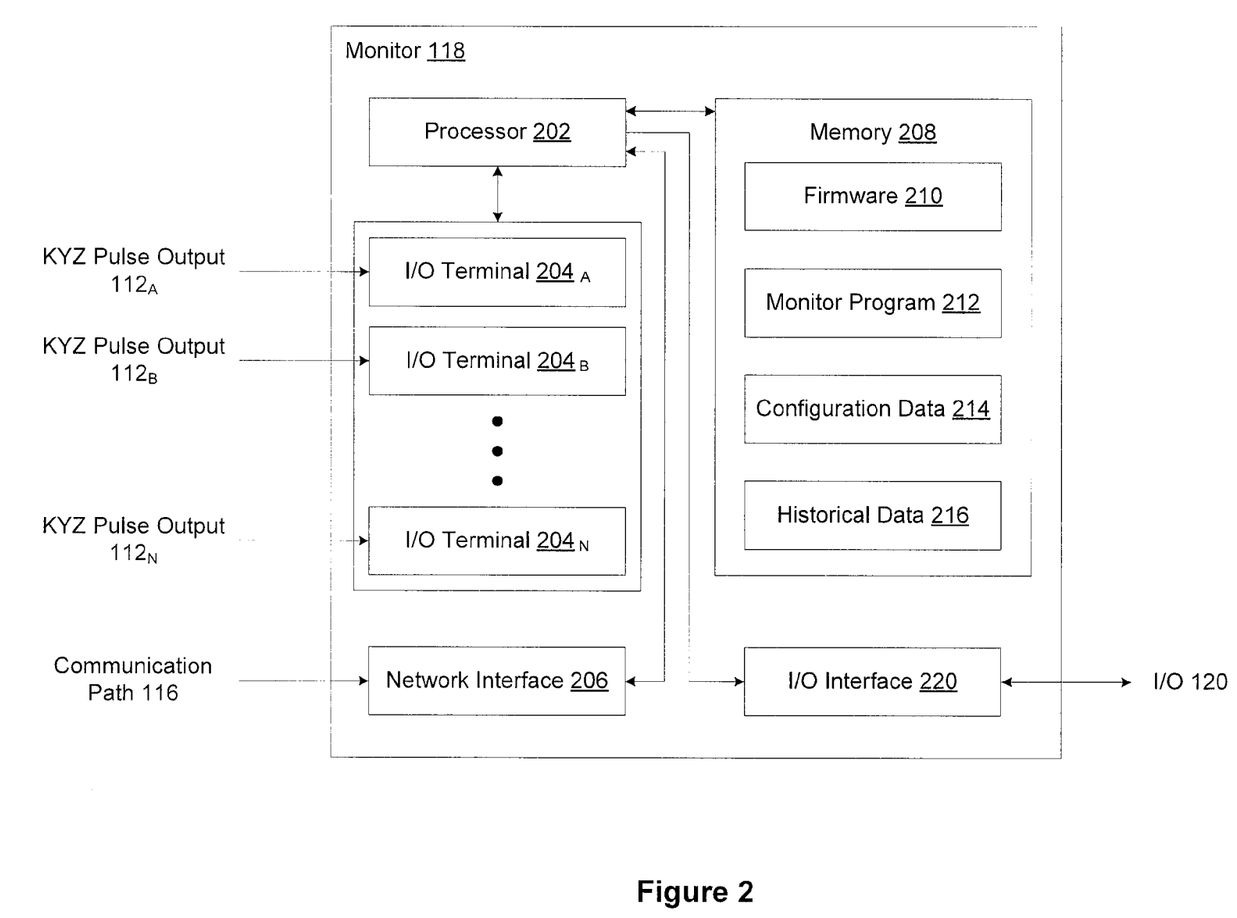
FIG. 2 illustrates a detailed view of a monitor, according to one embodiment of the present invention.

FIG. 2 illustrates a detailed view of the monitor 118, according to one embodiment of the present invention. As shown, the monitor 118 includes a plurality of I/O terminals $204_A$-$204_N$, each able to accept a KYZ output 118 as input. Thus, the monitor 118 may be configured to interact with multiple utility meters 106. To process the information received at I/O terminals 204, the monitor 118 includes a processor 202 coupled to the I/O terminals 204, the network interface 206, the memory 208, and the I/O interface 220. The memory 208 stores firmware 210, monitor program 212, configuration data 214, and historical data 216.

The firmware 210 provides instructions enabling the processor 202 to execute the monitor program 212. For example, the firmware 210 may be configured to execute ISaGRAF-based programs, which allow a highly customizable monitor program 212 to be configured and executed. In another example, the firmware 210 may be configured to execute Java™ based programs (via a Java Virtual Machine™), which also allow a highly customizable monitor program 212 to be configured and executed. The firmware 210 may also maintain a current time and date used to provide a number of features included in the monitor program 212, as further described herein. To customize the behavior of the monitor program 212, the configuration data 214 is read by processor 202. The historical data 216 represents utility flow rates that may be read or updated by the processor 202.

As also shown, the monitor 118 includes the network interface 206. In one embodiment, the network interface 206 is a TCP/IP based network card that communicates with the processor 202 and enables the user to remotely interact with the monitor program 212 via communication path 116. For example, if the network interface 206 is assigned a public IP address, then the user can enter this address into his or her internet browser to request access to a user interface of the monitor program 212. In one embodiment, the user interface facilitates interactions between the user and the monitor 118, including, for example, managing the configuration data 214, interacting with the historical data 216, and updating the monitor program 212 and/or the firmware 210. In one example, the user may poll the monitor 118 via network interface 206 to retrieve all KYZ pulse data collected within a particular time frame, i.e. June $5^{th}$ through June $20^{th}$ of the present year.

The I/O interface 220 outputs display information via I/O 220. Such output information may be customized by the user via monitor program 212 to include specific utility usage statistics. For example, the monitor program 212 may be configured to output both a current utility flow rate and a cumulative flow rate. Additionally, the I/O interface 220 may receive information from the input device 124, e.g., a keyboard used to configure the monitor 118 without requiring a remote connection via the communication path 116. Optionally, the display device 122 may incorporate touch-input capabilities, allowing direct input via the display device 122.

Figure 3:
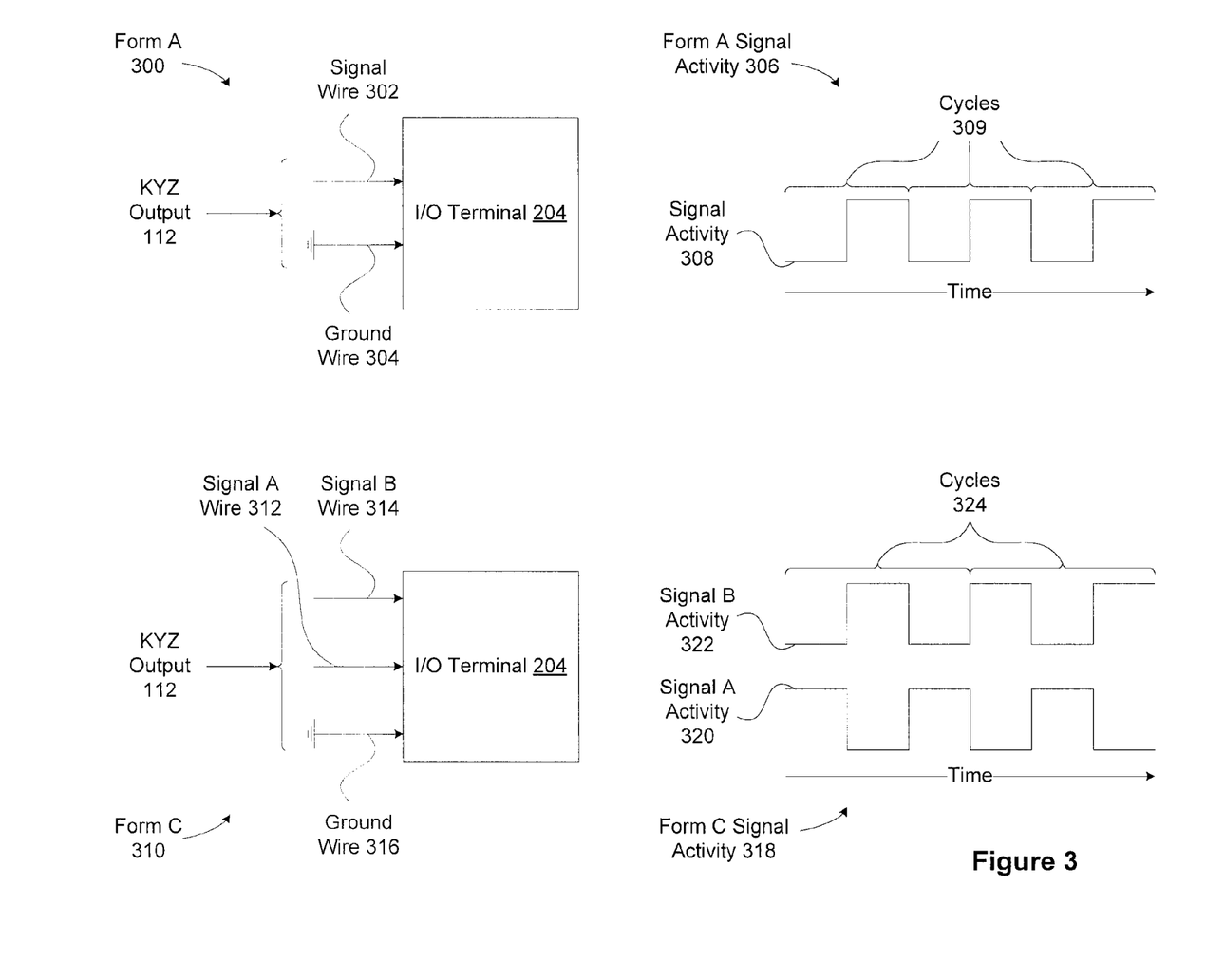
FIG. 3 illustrates a detailed view of an I/O terminal configured to receive a KYZ output, according to one embodiment of the invention.

FIG. 3 illustrates a detailed view of an I/O terminal 204 configured to receive a KYZ output 112, according to one embodiment of the present invention. Form A 300 illustrates a popular industry standard configuration of a KYZ output-enabled utility meter. As shown, the KYZ output 112 includes a signal wire 302 and a ground wire 304. In this configuration, the signal wire 302 and the ground wire 304 are each coupled to an I/O terminal 204. Additionally, the processor 202 is configured to monitor signal wire 302 to identify KYZ pulses received from the utility meter 106 via the KYZ output 112. Form A signal activity 306 illustrates a method to measure a KYZ pulse when coupled to a utility meter 106 using Form A 300. The processor 202 monitors the signal activity 308 to identify the completion of an off-on-off signal sequence, each illustrated as a cycle 306. Here, therefore, each cycle 309 represents one complete KYZ pulse output by the utility meter 106.

Form C 310 illustrates another popular industry standard configuration of KYZ output-enabled utility meters. As shown, the KYZ output 112 includes a signal A wire 312, a signal B wire 314, and a ground wire 316, each coupled to an I/O terminal 204. As with Form A 300, the processor 202 is configured to monitor the signal A wire 312 and the signal B wire 314 to identify KYZ pulses received from the utility meter 106 via the KYZ output 112. Next, Form C signal activity 318 illustrates a method to measure a KYZ pulse when coupled to a utility meter 106 using Form C 310. As shown, the signal A activity 320 and the signal B activity 322 are each monitored to identify the signal A completing an off-on-off sequence and the signal B completing an off-on-off sequence. Thus, each of the cycles 324 represents one complete KYZ pulse output by the utility meter 106.

As previously described, the monitor 118 may receive and process KYZ pulses from a plurality of different utility meters simultaneously. For example, at a manufacturing facility, a single monitor 118 may be configured to process KYZ pulses from each of an electricity meter, a gas meter, a water meter, and/or any additional meters that the monitor 118 is capable of handling. Advantageously, this approach provides a user with a centralized overview of utility flow measurements, each of which may be further processed to deliver useful information, as described in further detail below. In addition, the monitor 118 may also be configured to aggregate KYZ pulses received from two or more meters. For example, if electricity is provided to a building via two separate power lines, each having a separate meter, then the monitor 118 may combine KYZ pulses received from the two meters.

Figure 4:
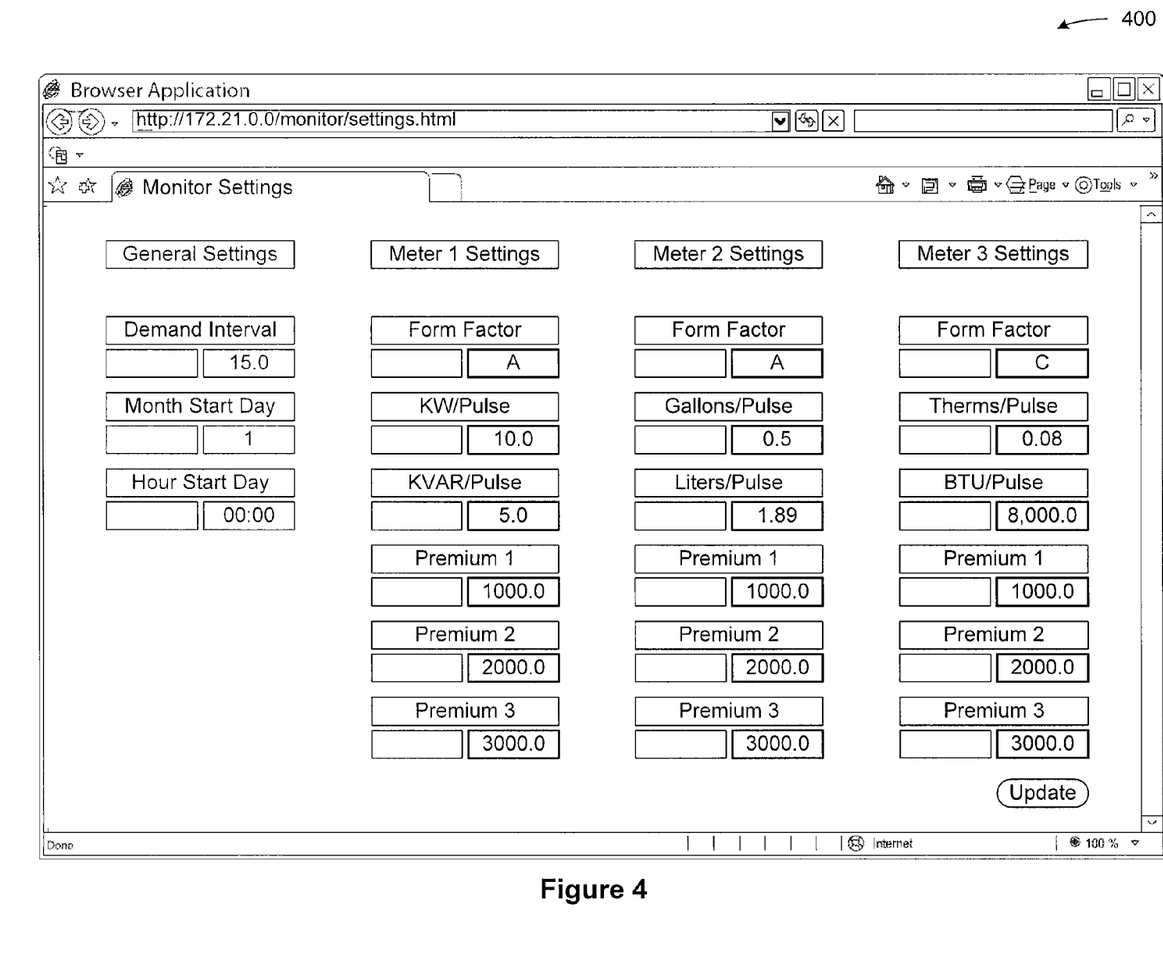
FIG. 4 illustrates an example configuration interface for a monitor program, according to one embodiment of the invention.

FIG. 4 illustrates an example configuration interface 400 for the monitor program 212, according to one embodiment of the invention. Here, the configuration interface 400 includes both a general settings panel (demand interval, month start day, hour day, etc.) and a configuration panel for three different meters that are attached to the monitor 118. The current value set for each field is displayed on the right side of each column, while a text field is provided on the left side that can be used to update the value. Once the user has completed his or her entry of values for the fields, he or she selects the update button, which causes the monitor program 212 to read the values and update the configuration data 214 accordingly.

Figure 5:
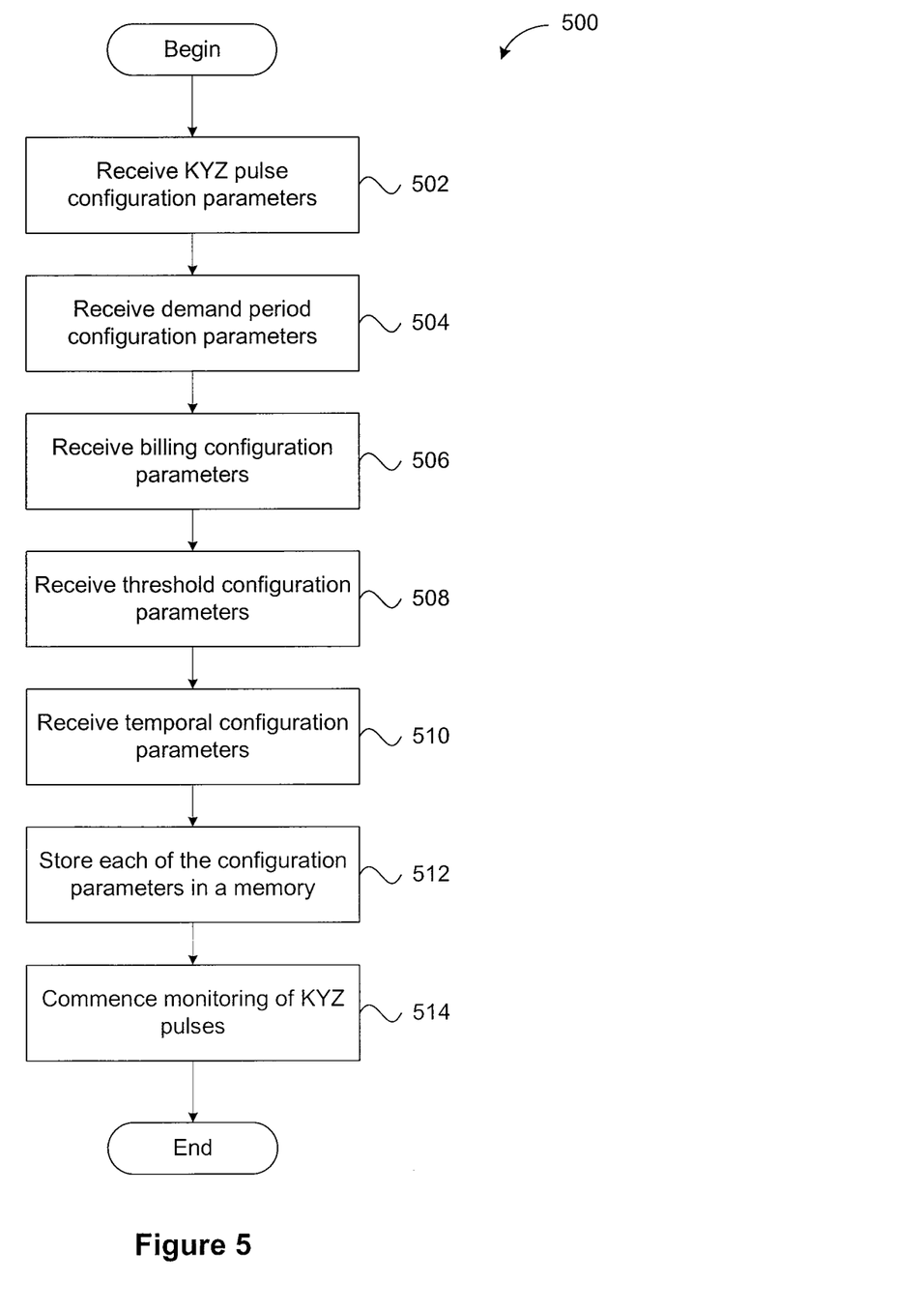
FIG. 5 illustrates a method for configuring the operation of a monitor program, according to one embodiment of the invention.

FIG. 5 illustrates a method 500 for configuring the operation of monitor program 212, according to one embodiment of the invention. The operations of method 500 are described relative to each of the components comprising the system configuration 100 described above in conjunction with FIGS. 1-4. As shown, the method 500 begins at step 502, where the monitor program 212 receives KYZ pulse configuration parameters. As previously described, such parameters pertain to information associated with the utility being measured e.g. electricity, gas or water, the form of the KYZ output 112 e.g. Form A, Form C, or a customizable Form, and/or the unit of utility that is represented by each KYZ pulse (e.g., 0.1 kilowatt hours per KYZ pulse).

At step 504, the monitor program 212 receives demand period configuration parameters, which provide information associated with the rate at which the billing price of the utility being measured is updated. Typically, the total time in a day is divisible by the demand period, such as a demand period set to fifteen minutes. Assuming such a demand period, the monitor program 212 would be configured to reference billing configuration parameters every fifteen minutes and update a current billing rate accordingly.

At step 506, the monitor program 212 receives billing configuration parameters, which provide information associated with billing rate relative to, for example, time and/or utility usage. Such billing parameters may be defined using a set of pre-defined billing areas. For example, the billing configuration may specify that a kilowatt of energy consumed between 8:00 AM and 5:00 PM is billed at $1.00, while a kilowatt of energy consumed between 5:00 PM and 8:00 AM is billed at $0.75. The billing parameters may also any include user-configurable billing configuration parameters that may be defined using, for example, ISaGRAF-based instructions. In one example, the billing configuration may be customized to specify that, when a total of 1000 kilowatts have been consumed before a reset time is reached (e.g., at the end of the month), the price of each kilowatt consumed thereafter is billed at a 25% increase.

At step 508, the monitor program 212 receives threshold configuration parameters, which provide information specifying any limits which the monitor program 212 should notify the user when reached in the field. Similar to the billing parameters described above in step 506, the user may include pre-defined thresholds along with user-configurable threshold configuration parameters. For example, the user could compose a custom rule that causes the monitor program 212 to text-message or email a notification to the appropriate party when a rate exceeds 5 kilowatts per minute.

At step 510, the monitor program 212 receives temporal configuration parameters, which provide information specifying any dates and times associated with the utility and/or a billing period. For example, temporal configuration parameters may include a total amount of time that should pass before a billing period is reset. At step 512, the monitor program 212 stores the configuration parameters received at steps 502, 504, 506, 508 and 510 in the memory 208. Following step 512, the monitor program 212 is prepared for execution of monitoring KYZ pulses. At step 514, monitor program 212 begins monitoring KYZ pulses received from the utility meter and as specified by the configuration parameters.

Figure 6:
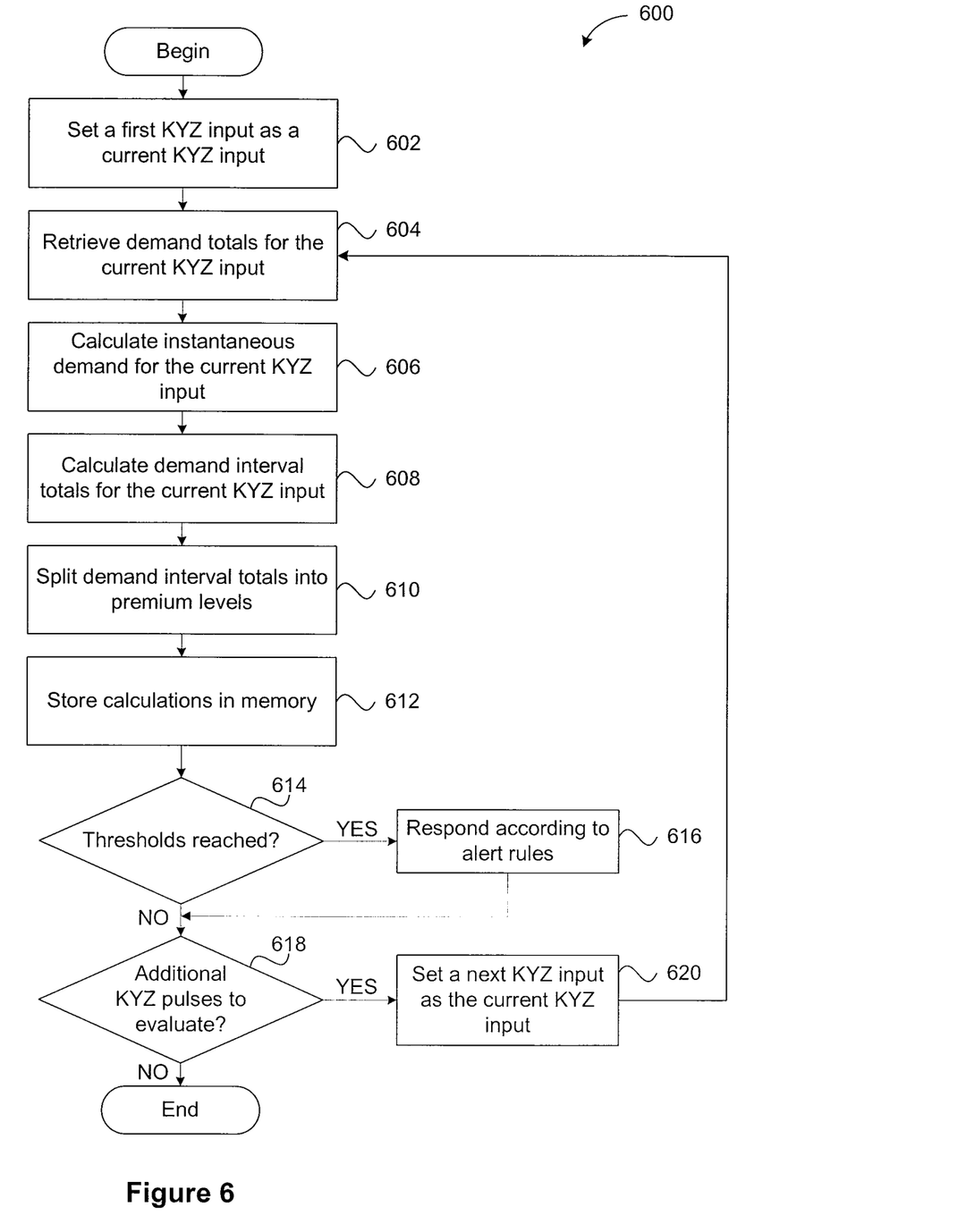
FIG. 6 illustrates a method for monitoring one or more utility meters, according to one embodiment of the invention.

FIG. 6 illustrates a method 600 for monitoring one or more utility meters 106, according to one embodiment of the invention. The operations of method 600 are described relative to each of the components comprising the system configuration 100 described above in conjunction with FIGS. 1-4. As shown, the method 600 begins at step 602, where the monitor program 212 sets a first KYZ pulse input as a current KYZ pulse input.

At step 604, the monitor program 212 retrieves demand totals for the current KYZ input. In one embodiment, the monitor program 212 increments a different KYZ counter associated with each of the KYZ inputs. Such different KYZ inputs may come, for example, from a meter that monitors multiple utilities, or from multiple meters that each monitors a different utility. Accordingly, each counter is incremented every time a KYZ pulse is received via the respective KYZ input. Thus, the demand totals for the current KYZ input may be retrieved by referencing the KYZ counter associated therewith.

At step 606, the monitor program 212 calculates an instantaneous demand for the current KYZ input. In one embodiment, this calculation is performed using a so-called "boxcar average" method. For example, if one hundred and twenty seconds of KYZ pulse data is maintained in memory for the current KYZ input, each new value is added to the end and the oldest value is discarded. This data may then be modified using a second 5-second boxcar average to smooth the result. The smoothed data is multiplied by thirty and the unit of utility (e.g., kilowatts?) per pulse to yield an hourly demand rate.

At step 608, the monitor program 212 calculates demand interval totals for the current KYZ input. Such calculations may be performed, for example, by referencing the configuration data 214 to identify the demand interval in the general settings described above in conjunction with FIG. 4. Next, the monitor program 212 segments the demand totals retrieved in step 604 into portions equal to the size of the demand interval.

At step 610, the monitor program 212 splits up the demand interval totals into premium levels. More specifically, the monitor program 212 retrieves the premiums included in the configuration data 214 and, if present, any rules included in the configuration data 214 related to billing premiums, thereby accurately establishing premium levels. At step 612, the monitor program 212 stores the calculations to the memory 208.

At step 614, the monitor program 212 determines whether any thresholds have been reached. The data retrieved and/or calculated above in steps 604-610 may be processed by any threshold rules included in the configuration data 214. Accordingly, when a threshold is reached, a corresponding alert is processed at step 616 according to the rule. Otherwise, at step 618, the monitor program 212 determines whether there are additional KYZ pulses to evaluate. If so, then the method 600 proceeds to step 620 to evaluate additional KYZ pulses.

At step 620, the monitor program 212 sets a next KYZ input is set as the current KYZ input. The monitor program 212 may then repeat the steps of method 600, as described, until each received KYZ inputs has been evaluated.

Advantageously, embodiments of the invention provide a combination of hardware and firmware configured to receive and perform useful measurements on KYZ pulses received from one or more utility meters, where each KYZ pulse is representative of a predefined amount of utility being consumed. The firmware is calibrated according to the KYZ pulse settings of each utility meter. Subsequently, each KYZ pulse is received by the firmware and stored in memory, whereupon a user may interact with active and historical consumption data.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for monitoring a consumption of one or more metered resources, the method comprising:

receiving a KYZ pulse from a first utility meter, wherein the first utility meter is coupled to a source of one of the metered resources, and wherein the first utility meter outputs the KYZ pulse based on a predefined amount of metered resource being passed through the utility meter;

incrementing a first counter associated with a current demand period, wherein the first counter is associated with the utility meter and stored in a memory;

determining, based on configuration data stored in the memory, that a new demand period has been reached;

calculating, based on a number of times the first counter has been incremented within a fixed period of time, an instantaneous demand value for the current demand period;

determining, based on the configuration data, that a threshold value has been reached; and responding according to a rule associated with the threshold value.

2. The computer-implemented method of claim 1, wherein the KYZ pulse is received via a single channel or via two channels.

3. The computer-implemented method of claim 1, wherein the rule specifies to send one of an email and a short-message-service (SMS) message to a recipient.

4. The computer-implemented method of claim 1, further comprising:

updating a user-interface to include:
  the instantaneous demand value; and
  a total consumption value based on the first counter; and
outputting the user-interface via a network connection.

5. The computer-implemented method of claim 1, further comprising:
  aggregating, based on the configuration data, the first counter and a second counter associated with a second utility meter.

6. The computer-implemented method of claim 1, wherein the instantaneous demand value is converted into a unit of measurement that corresponds to the metered resource being measured by the first utility meter.

7. The computer-implemented method of claim 1, wherein the source of the metered resource is one of an electrical line, a gas line, and a water line.

8. A system, comprising:
  a processor; and
  a memory storing an application which, when executed on the processor, performs an operation for monitoring and storing data associated with a consumption of a plurality of metered resources, the operation comprising:
    receiving a KYZ pulse from a first utility meter, wherein the first utility meter is coupled to a source of one of the metered resources, and wherein the first utility meter outputs the KYZ pulse based on a predefined amount of metered resource being passed through the utility meter,
    incrementing a first counter associated with a current demand period, wherein the first counter is associated with the utility meter and stored in a memory,
    determining, based on configuration data stored in the memory, that a new demand period has been reached, and
    calculating, based on a number of times the first counter has been incremented within a fixed period of time, an instantaneous demand value for the current demand period,
    determining, based on the configuration data, that a threshold value has been reached, and
    responding according to a rule associated with the threshold value.

9. The system of claim 8, wherein the KYZ pulse is received via a single channel or via two channels.

10. The system of claim 8, wherein the rule specifies to send one of an email and a short-message-service (SMS) message to a recipient.

11. The system of claim 8, wherein the operation further comprises:
  updating a user-interface to include:
    the instantaneous demand value; and
    a total consumption value based on the first counter; and
  outputting the user-interface via a network connection.

12. The system of claim 8, wherein the operation further comprises:
  aggregating, based on the configuration data, the first counter and a second counter associated with a second utility meter.

13. The system of claim 8, wherein the instantaneous demand value is converted into a unit of measurement that corresponds to the metered resource being measured by the first utility meter.

14. The system of claim 8, wherein the source of the metered resource is one of an electrical line, a gas line, and a water line.

15. A computer-readable storage medium containing an application which, when executed on a processor, performs an operation for monitoring and storing data associated with a consumption of one or more metered resources, the operation comprising:
  receiving a KYZ pulse from a first utility meter, wherein the first utility meter is coupled to a source, and wherein the first utility meter outputs the KYZ pulse based on a predefined amount of metered resource being passed through the utility meter;
  incrementing a first counter associated with a current demand period, wherein the first counter is associated with the utility meter and stored in a memory;
  determining, based on configuration data stored in the memory, that a new demand period has been reached;
  calculating, based on a number of times the first counter has been incremented within a fixed period of time, an instantaneous demand value for the current demand period;
  determining, based on the configuration data, that a threshold value has been reached; and
  responding according to a rule associated with the threshold value.

* * * * *